Aug. 12, 1924.
C. H. HAYS
ADVERTISING DEVICE
Filed Oct. 22, 1923
1,504,758
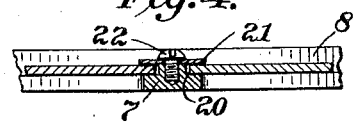
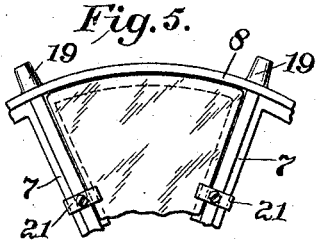
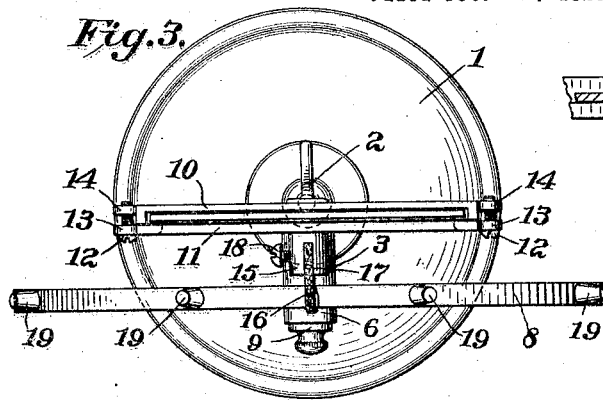
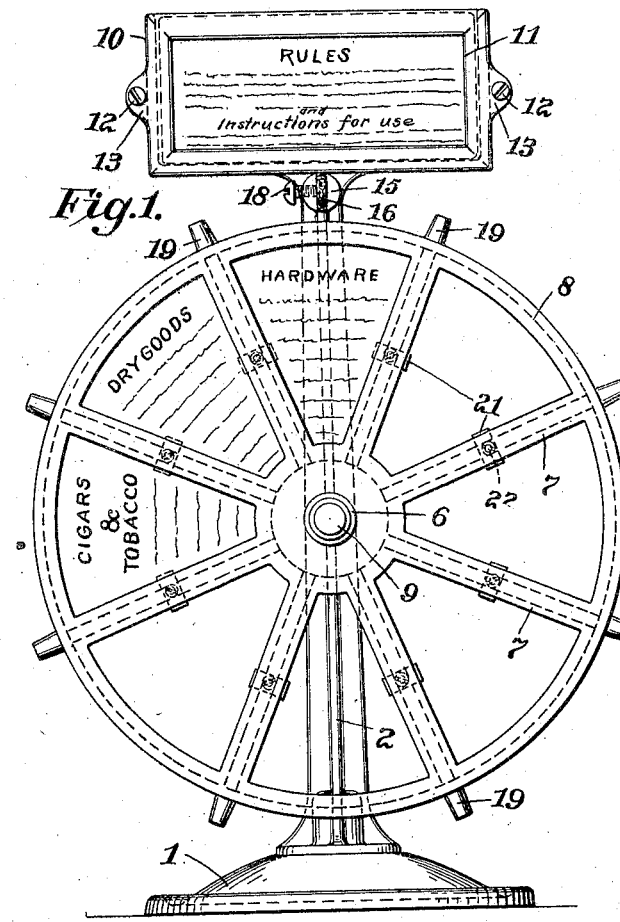
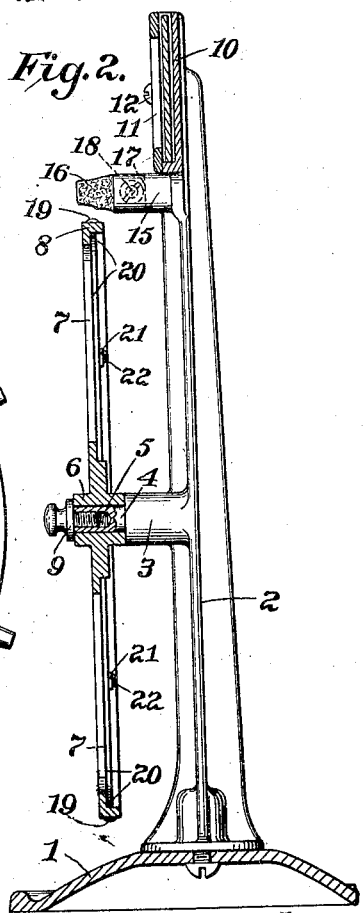
Inventor:
Claude H. Hays,
by Spear, Middleton, Donaldson & Hall
Attys.

Patented Aug. 12, 1924.

1,504,758

UNITED STATES PATENT OFFICE.

CLAUDE H. HAYS, OF UNION, MISSISSIPPI.

ADVERTISING DEVICE.

Application filed October 22, 1923. Serial No. 670,159.

*To all whom it may concern:*

Be it known that I, CLAUDE H. HAYS, a citizen of the United States, and resident of Union, in the county of Newton and State of Mississippi, have invented certain new and useful Improvements in Advertising Devices, of which the following is a specification.

My present invention relates to an advertising device, and its principal object is the provision of such means which will be amusing and entertaining to the public directly interested, and which will also further business intercourse and cooperation between the various concerns contributing to this effect.

The invention consists in a rotatable wheel mounted on a suitable standard, the wheel being provided with the usual spokes and rim. Between the spokes and the rim places are provided for the insertion of advertising matter which will indicate the business concern owning the advertisement. On the periphery of the rim of the wheel, stops or pins are provided, and on the frame a flexible member projects therefrom to a point between the pins on the periphery of the wheel so that as the wheel spins the pins or stops brush against the flexible member with partial retarding effect, and this continues until the wheel comes to rest. As I contemplate using this device, the spinner of the wheel will now be entitled to a coupon which may be redeemed by the business house owning the advertisement located between the pins or stops, and between which the flexible member is located when the wheel comes to rest.

The invention further consists in an arrangement with various business concerns to enter their advertisements in the device and issue redeemable coupons, whereby business relations between the consumer and the commercial establishment will be fostered.

I have illustrated in the accompanying drawing, one form of device which will satisfactorily produce the above result, but I do not wish to be limited to the form illustrated, as this is merely a preferred example of the invention.

In these drawings:—

Figure 1 is a front view of my device.

Fig. 2 is a side elevation, partly in section.

Fig. 3 is a plan view.

Figs. 4 and 5 are details.

Referring now to the example illustrated, I have shown a base at 1 carrying an upright standard 2 upon which is located a stud 3 upon which is mounted an axle 4 provided at the end thereof and axially thereof, with a screw threaded aperture 5. A wheel comprising a hub 6, radiating spokes 7 and a rim 8, is provided, the hub 6 thereof being journaled upon the axle 4. A fancy stop 9 provided with a screw threaded portion, is adapted to be screwed into the aperture 5 and hold the wheel on the axle.

Upon the top of the standard 2 is mounted a display frame 10 having a removable apertured plate 11 secured thereto, as by means of the screws 12 passing through ears 13 in the apertured plate and engaging the screw threaded aperture in ears 14 on the display frame 10. Below the frame 10 is located an outwardly projecting stud 15 which carries a piece of leather, or the like, 16, located in a slot 17 in the stud and secured in this location as by screw 18. The leather 16 projects outwardly to a point beyond the plane of the wheel and sufficiently near the rim 8 to project between the pins 19 which form substantial continuations of the spokes 7. It will thus be apparent that upon rotating the wheel about its axis, each pin 19 will engage the leather 16 with retarding effect upon rotation of the wheel. This continues until rotation ceases and the leather 16 will occupy a position between adjacent pins 19.

The spokes 7 and the rim 8 are stepped, as at 20, which forms a substantially triangular area within which may be inserted from the rear, a card or the like bearing certain advertising matter. A holding device for these cards, such as a plate 21 secured to the spoke as by screw 22, is utilized to prevent the cards from being accidentally displaced, as by rotating the member 21 to a position laterally of the spoke 7.

One use of the device as contemplated by me, is as follows: To various business houses in a community will be rented a space between spokes within which they may place their advertisement. A business house may take more than one space if it so desires. The wheel, with each space occupied by an advertisement, will now be placed where the public will have access thereto and may read the directions for its use, as can be indicated by placing printed instructions within the display frame 10. If for instance, the device is placed upon the counter in a drug store, the purchaser of an article at a definite price will be accorded the privilege of spinning the wheel. When the wheel comes to rest the spinner will be given a coupon which may be redeemable in merchandise or otherwise, by the business house owning the advertisement between the spokes and indicated by the flexible member. Various arrangements may be entered into with business houses in the locality so that one or more coupons may be necessary before an article of merchandise will be exchanged therefor, as circumstances will indicate.

It will be apparent that only one customer will be allowed to spin the wheel at a time, and such being the case, he will always receive a coupon as a result of this spin.

It is desirable that the advertisements be arranged in such a manner that they will read clearly and be in the upright position when the spokes between which they are included occupy an upright position.

Having thus described my invention, what I claim is:—

1. An advertising device, including a base, a standard thereon, an axle carried by said standard, and a rotatable wheel on the axle, pins projecting outwardly from the periphery of the wheel, and a flexible stop carried by the standard projecting between the pins to retard rotary movement of the wheel, said wheel having spokes with openings between the same, and cards located between the spokes.

2. An advertising device, including a base, a standard mounted thereon, an axle carried by the standard, a rotatable wheel on said axle, said wheel having radial spokes, a rim joining said spokes, said spokes and rim being provided with stepped portions, advertising matter seated on the stepped portions of the spokes and rim, means carried by each spoke for retaining the advertising matter in the proper position, pins carried by the rim, a flexible member carried by the standard, and projecting beyond the plane of the wheel and in the path of the pins, and a display frame upon the top of the standard.

In testimony whereof, I affix my signature.

CLAUDE H. HAYS.